US012394282B2

(12) United States Patent
Schlingmann

(10) Patent No.: US 12,394,282 B2
(45) Date of Patent: Aug. 19, 2025

(54) AUTOMATED TELLER MACHINE AND METHOD FOR DETECTING TAMPERING WITH THE AUTOMATED TELLER MACHINE

(71) Applicant: Wincor Nixdorf International GmbH, Paderborn (DE)

(72) Inventor: Andy Schlingmann, Enger (DE)

(73) Assignee: DIEBOLD NIXDORF SYSTEMS GMBH, Paderborn (DE)

( * ) Notice: Subject to any disclaimer, the term of this patent is extended or adjusted under 35 U.S.C. 154(b) by 0 days.

(21) Appl. No.: 17/919,689

(22) PCT Filed: Apr. 15, 2021

(86) PCT No.: PCT/EP2021/059793
§ 371 (c)(1),
(2) Date: Oct. 18, 2022

(87) PCT Pub. No.: WO2021/223971
PCT Pub. Date: Nov. 11, 2021

(65) Prior Publication Data

US 2024/0296707 A1 Sep. 5, 2024

(30) Foreign Application Priority Data

May 7, 2020 (DE) ........................ 102020112413.9

(51) Int. Cl.
*G07F 19/00* (2006.01)
*G07D 11/14* (2019.01)
(Continued)

(52) U.S. Cl.
CPC ........... *G07F 19/209* (2013.01); *G07D 11/14* (2019.01); *G07D 11/225* (2019.01); (Continued)

(58) Field of Classification Search
None
See application file for complete search history.

(56) References Cited

U.S. PATENT DOCUMENTS

| | | | | |
|---|---|---|---|---|
| 11,361,631 | B2 | 6/2022 | Kujat | |
| 2004/0222296 | A1 | 11/2004 | Douglass | |
| 2008/0136657 | A1 * | 6/2008 | Clark | G07F 19/20 340/686.6 |

FOREIGN PATENT DOCUMENTS

| | | | |
|---|---|---|---|
| DE | 102010000008 | A1 | 7/2011 |
| EP | 0902303 | A2 | 3/1999 |
| JP | 2016184283 | A | 10/2016 |

OTHER PUBLICATIONS

International Search Report filed in the corresponding PCT application dated Jul. 9, 2021; 3 Pages.

(Continued)

*Primary Examiner* — Sonji N Johnson
*Assistant Examiner* — April A Taylor
(74) *Attorney, Agent, or Firm* — Black McCuskey

(57) ABSTRACT

An automated teller machine comprises at least one RGB light source, which is disposed on an operating side of the automated teller machine and emits an RGB mixed light, and an optical RGB sensor for sensing the RGB mixed light emitted by the RGB light source, the optical RGB sensor being disposed at a distance from the RGB light source. Furthermore, the automated teller machine comprises a control unit, which is designed such that the control unit detects tampering with the automated teller machine on the basis of the emitted and the sensed RGB mixed light.

4 Claims, 8 Drawing Sheets

(51) Int. Cl.
*G07D 11/225* (2019.01)
*G07D 11/60* (2019.01)

(52) U.S. Cl.
CPC ........ *G07F 19/205* (2013.01); *G07F 19/2055* (2013.01); *G07F 19/207* (2013.01); *G07D 11/60* (2019.01)

(56) References Cited

OTHER PUBLICATIONS

Written Opinion filed in the corresponding PCT application dated Jul. 9, 2021; 6 Pages.

* cited by examiner

AUTOMATED TELLER MACHINE AND METHOD FOR DETECTING TAMPERING WITH THE AUTOMATED TELLER MACHINE

BACKGROUND

1. Field of the Invention

The invention relates to an automated teller machine having at least one RGB light source and an RGB sensor for monitoring regions of the automated teller machine and to a method for detecting tampering with the automated teller machine.

2. Description of Related Prior Art

Regions of automated teller machines, in particular operating elements or output regions, can be manipulated by criminal third parties by various measures, for example, by cash trapping measures. A cash trapping element, which in particular emulates a closure element in a visually similar manner, is arranged here in the output region such that an operator cannot remove banknotes from the output compartment even when the closure element is opened. The cash trapping element often gives the impression of a closed closure element to an operator or bank customer, wherein with the aid of the cash trapping element, criminal third parties can remove banknotes requested by the operator from the output region.

Solutions are known from the prior art in which camera units monitor the automated teller machine. From document DE 10 2011 010 737 A1, for example, recording an image of the automated teller machine at predetermined time intervals and/or after movement of objects in the region in front of the machine with the aid of a camera and comparing this image to a setpoint image is known. It can be ascertained via the image comparison whether objects were attached in an unauthorized manner to the automated teller machine.

These solutions have the disadvantage that equipping the automated teller machine with camera units is linked to high costs and the image comparison has to be carried out with the aid of complex image processing methods.

SUMMARY

It is the object of the invention to specify an automated teller machine having at least one RGB light source and an RGB sensor for monitoring regions of the automated teller machine and a method for detecting tampering with the automated teller machine, so that occasions of tampering with the automated teller machine can be reliably detected.

This object is achieved by an automated teller machine as recited in the independent claim(s). Advantageous refinements are specified in the dependent claims.

The automated teller machine comprises at least one RGB light source, which is arranged on an operating side of the automated teller machine and emits an RGB mixed light, and an optical RGB sensor arranged at a distance from the RGB light source for registering the RGB mixed light emitted by the RGB light source. Furthermore, the automated teller machine comprises a control unit which is designed such that it detects tampering proceeding from the emitted and registered RGB mixed light. In this way, tampering with the automated teller machine is detected particularly reliably. In particular, cash trapping elements in front of an output compartment are detected particularly quickly and reliably. Furthermore, tampering with the monitoring assembly comprising the RGB light source, the RGB sensor, and the control unit is prevented or at least made more difficult. RGB stands for the RGB color space, in which a mixed color is generated by the additive mixing of three base colors (red, green, blue). An RGB sensor typically registers in this case each of the base colors (RGB) using an associated element which registers the brightness of the light of one of the base colors (RGB) in each case. The RGB sensor therefore has at least three elements in a sensor assembly and an equal number of elements which each register one base color (RGB). The RGB mixed color results due to the ratio of the brightness of the individual base colors (RGB) to one another. The element in particular comprises a photodiode. In particular, the RGB sensor comprises 1 to 20 sensor assemblies each having three photodiodes.

It is advantageous if the control unit is designed such that it actuates the RGB light source to vary at least one property of the emitted RGB mixed light according to a preset pattern. The emitted light is thus coded and tampering with the emitted light by third parties is made more difficult.

It is particularly advantageous if the RGB sensor registers the property of the emitted RGB mixed light. In this way, the RGB mixed light is reliably detected.

It is particularly advantageous if the property of the emitted RGB mixed light is a brightness or a ratio of components R, G, and B. In this way, the RGB light source can be actuated particularly flexibly.

It is advantageous if the RGB light source comprises an optical element which directs the emitted RGB mixed light directly or indirectly onto the RGB sensor and/or that the RGB light source comprises an optical element which scatters the emitted RGB mixed light. In this way, the RGB light source and the RGB sensor can be arranged and used particularly flexibly.

It is advantageous if the at least one RGB light source is arranged such that it at least partially illuminates a region of the operating side of the automated teller machine or generates a light effect to highlight a region of the operating side or indicates an operating status of the automated teller machine. In this way, the RGB light source is arranged particularly inconspicuously on the operating side of the automated teller machine and is not perceived as a monitoring element.

It is particularly advantageous if multiple RGB light sources are arranged in a strip shape in or around the region. In this way, the RGB light sources can be arranged particularly flexibly on operating elements of the automated teller machine.

It is advantageous if the operating side comprises a display unit, an input and/or output compartment, and/or an input unit. In this way, operating elements of the automated teller machine are particularly easy to operate for an operator.

It is particularly advantageous if the RGB sensor is arranged inside the output compartment and registers the RGB mixed light when the output compartment is open. In this way, tampering with the automated teller machine is detected particularly reliably and the risk of tampering with the RGB sensor is reduced.

It is advantageous if the RGB sensor is arranged on the operating side, in particular inside an output region, and registers the RGB mixed light. In this way, a cash trapping element can be detected particularly reliably.

It is advantageous if at least one optical element reflects the RGB mixed light emitted by the RGB light source onto the RGB sensor and the RGB sensor registers the reflected RGB mixed light. In this way, the RGB light source and the RGB sensor can be arranged particularly flexibly.

It is advantageous if the automated teller machine comprises multiple optical RGB sensors. In this way, tampering can be detected particularly reliably.

It is advantageous if the optical RGB sensor is arranged such that it registers the RGB mixed light of only one RGB light source or a group of RGB light sources. A particularly reliable registration of the RGB mixed light by the RGB sensor is thus ensured and the sensitivity of the RGB sensor with respect to interfering light is reduced.

It is advantageous if the control unit establishes tampering if the control unit does not identify the RGB mixed light registered by the sensor at least partially as the RGB mixed light emitted by the RGB light source. In this way, an assembly for monitoring a region of the automated teller machine is particularly secure from tampering.

In the method for detecting tampering with an automated teller machine, with the aid of at least one RGB light source, which is arranged on an operating side of the automated teller machine, an RGB mixed light is emitted and with the aid of an optical RGB sensor arranged at a distance to the RGB light source, the RGB mixed light emitted by the RGB light source is registered. Tampering is detected proceeding from the emitted and registered RGB mixed light. In this way, tampering with the automated teller machine is detected particularly reliably. In particular, cash trapping elements in front of an output compartment are detected particularly quickly and reliably. The same advantages are achieved by the method as by the device as claimed in claim 1. Furthermore, the method can be refined in the same manner as described above for the device, in particular by the features specified in the dependent claims.

BRIEF DESCRIPTION OF THE DRAWINGS

Further features and advantages result from the following description, which explains embodiments in more detail in conjunction with the appended figures. In the figures.

DETAILED DESCRIPTION

Figure 1:
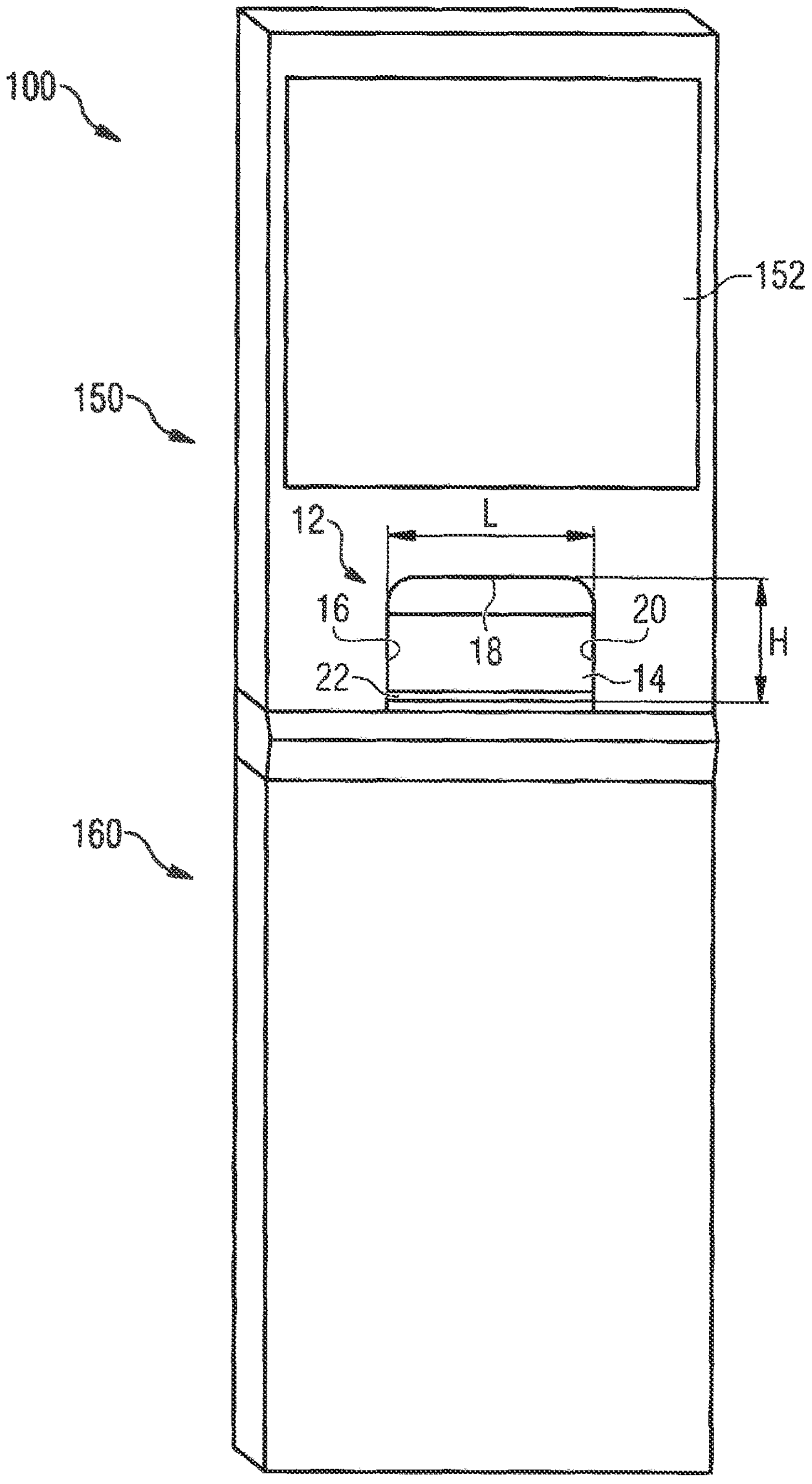
FIG. 1 shows a schematic illustration of an automated teller machine.

FIG. 1 shows a schematic illustration of an automated teller machine 100 having a head module 150 and a safe module 160. A banknote handling unit (not visible in FIG. 1) for the output of banknotes to be counted out to an operator is arranged in the interior of the head module 150. Multiple cash boxes (not shown) can be accommodated in the safe module 160. In particular items of operating information can be output to the operator via a display unit 152 in the head module 150. The display unit can be a touchscreen, via which the operator can operate the automated teller machine 100. Furthermore, the automated teller machine 100 can comprise further operating elements, for example, a keyboard and/or a so-called encrypting pin keypad, for secure identification of the operator.

The head module 150 comprises an output region 12, which is delimited by four delimitation walls 16, 18, 20, and 22 and, in the closed state shown in FIG. 1, by a closure element 14, also called a shutter. The distance L between the delimitation walls 16 and 20 has in particular a value in the range of 18 cm to 25 cm. The distance H between the delimitation walls 22 and 18 has in particular a value in the range from 8 cm to 25 cm. In FIG. 1, the shutter 14 is shown in a closed state.

All operating elements, display units, and the output region 12 of the automated teller machine 100, with which the operator interacts during use, are typically arranged on one side of the automated teller machine 100 and oriented so that they are reachable by the operator. This side is the operating side of the automated teller machine 100.

Behind the closed shutter 14, an output compartment (not visible in FIG. 1) is arranged, in which a banknote or a stack of banknotes is provided for removal by the operator. The output compartment is therefore arranged inside the output region 12. After the banknote or the stack of banknotes is provided in the output compartment, the shutter 14 is moved with the aid of a drive unit (not shown) from the closed position shown in FIG. 1 into an open position, in which the operator has access to the output compartment and the banknotes located therein through the output region 12. In the closed state of the shutter 14, the output compartment is arranged on one side and the output region 12 is arranged on the other side of the shutter 14.

Alternatively, the automated teller machine 100 is used both for the paying in of banknotes by an operator and also the paying out of banknotes to an operator and is also referred to as a recycling automated teller machine.

Figure 2:
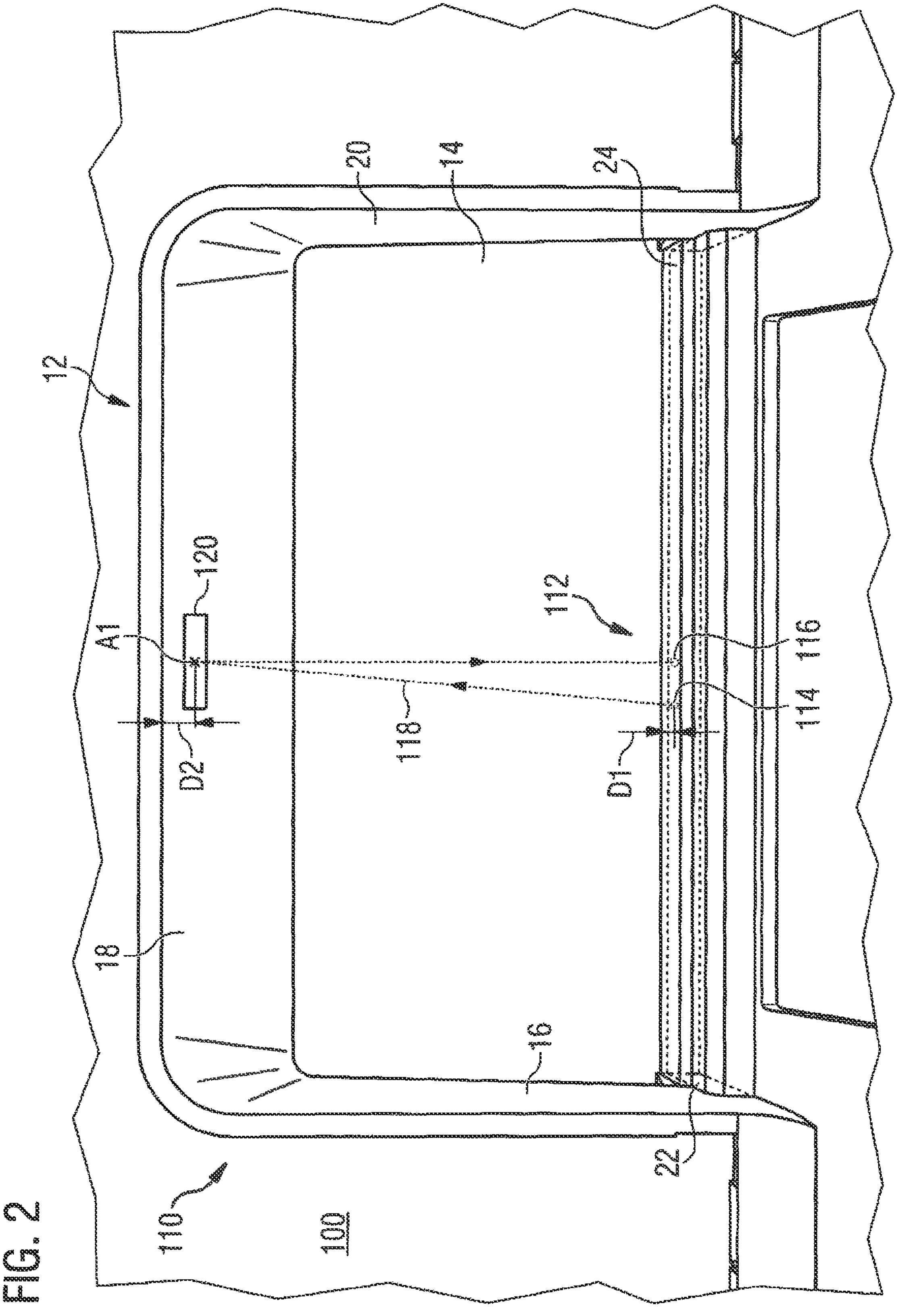
FIG. 2 shows an assembly for monitoring an output region of the automated teller machine as shown in FIG. 1 according to a first embodiment.

FIG. 2 shows a first embodiment of an assembly 110 for monitoring an output region 12 of the automated teller machine 100. The lower delimitation wall 22 comprises a region 24 translucent to light, in particular to visible light. In an alternative embodiment, the entire delimitation wall 22 can be produced from a translucent material. Alternatively, all delimitation walls 16, 18, 20, 22 can also be produced from a translucent material. A sensor unit 112, which: is designed as a reflection light barrier, is arranged in or behind the delimitation wall 22. The sensor unit 112 comprises an emitter 114 and a receiver 116, which are arranged adjacent to one another. In other embodiments, a reflection light barrier can additionally or alternatively be provided, the emitted light of which is not reflected to the receiver of the light barrier without an element arranged in the output region 12, but rather only when an element is arranged in the output region. The detection of the element thus takes place with the aid of the transmitted light principle.

A light beam 118 emitted by the emitter 114 is reflected back to the receiver 116 at a reflector 120, which is integrated in the delimitation wall 18 opposite to the delimitation wall 22. The reflector 120 has a reflectance, i.e., a ratio between reflected and incident radiation, of least at 50%. In particular a retroreflective film is used as the reflector 120. Retroreflective films can have a reflective substrate, in which small glass beads having a size of approximately 50 μm are incorporated. These are covered in particular by a transparent colored film for coverage or camouflage. In an alternative embodiment, the delimitation wall 18 is formed or coated such that without a special reflector, it has a sufficient reflection property for reflecting the light beam 118, so that it reaches the receiver 116.

In FIG. 2, only one reflection point A1, at which the light beam 118 is reflected, is shown for simple illustration. In practice, the light beam 118 is reflected on a surface which is dependent on the bundling of the emitted light beam 118. After the reflection of the light beam 118 at the reflector 120, at least a part of the reflected light beam 118 is incident on the receiver 116, which detects the incident, reflected light of the light beam 118. The sensor unit 112 is arranged in particular at a distance D1 from the shutter 14 of 0 mm to 10 mm, preferably of 3 mm to 5 mm, in particular of 5 mm. The sensor unit 112 is furthermore arranged and oriented such that the reflection point A1 in particular has a distance D2 from the front side of the head part of the automated teller machine of 0 mm to 50 mm, preferably of 5 mm to 10 mm, in particular of 5 mm.

The emitter 114 and the receiver 116 of the sensor unit 112 can, alternatively to the configuration shown in FIG. 2, also be arranged with greater distance in relation to one another along the delimitation wall 22, so that, as long as the sensor 114 and the receiver 116 are oriented on the reflection point A1, the output region can be monitored essentially over its width. Furthermore, multiple sensor units 112 can be arranged in the output region 110.

The sensor unit 112 can alternatively be arranged in one of the other delimitation walls 16, 18, 20, wherein the reflector 120 is arranged on the respectively opposite delimitation wall or an adjoining delimitation wall and the emitter 114 and the receiver 116 are each oriented on the same reflection point A1.

The arrangement of an element in the output region 12 between the sensor unit 112 and the reflector 120 causes an interruption of the light beam 118, which is detected by the receiver 116. The sensor unit 112 generates a detection signal from the point in time of the detection of the interruption and transmits the detection signal to a control unit of the automated teller machine 100. In the normal operating state of the automated teller machine 100, the light beam 118 is only interrupted for short periods of time in the range of 1 to 10 seconds, for example, during the removal of banknotes from the output region 12 by the operator.

However, the light beam 118 can also be interrupted if criminal third parties tamper with the output region 12, for example, in the course of so-called cash trapping measures. In the so-called external cash trapping measures, a cash trapping element is arranged in the output region 12. This cash trapping element in particular emulates the shutter 14 in a visually similar manner and conceals the shutter 14 such that an operator cannot remove banknotes from the output compartment even if the shutter 14 is open. The cash trapping element often gives the impression of a closed shutter 14 to an operator.

Figure 6:
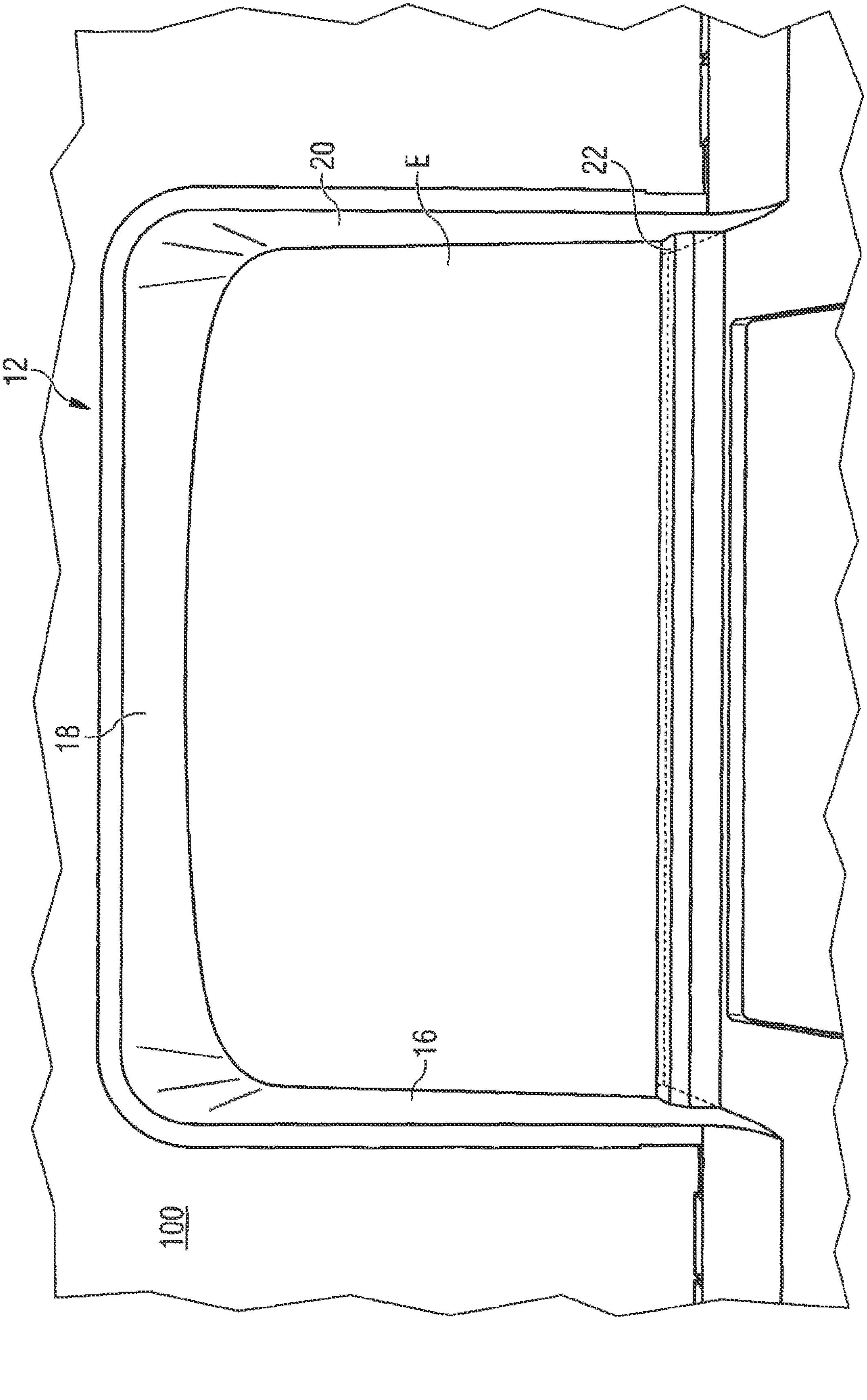
FIG. 6 shows the automated teller machine as shown in FIG. 1 in a status in which a cash trapping element is arranged in the output region.

FIG. 6 shows the automated teller machine 100 in a state in which a cash trapping element E is arranged in the output region 12 and conceals the shutter 14. Known cash trapping elements E comprise means which prevent closing of the shutter 14 open behind the cash trapping element E. Alternatively or additionally, the cash trapping elements comprise means to which one or more banknotes provided in the output compartment adhere. If the automated teller machine 100 is actuated by the operator to output banknotes, the shutter 14 does open, but the cash trapping element E prevents the access to the output compartment. As soon as the operator leaves the automated teller machine 100, the criminal third parties remove the cash trapping element E from the output region 12 and thus obtain access to the banknotes.

In the described tampering of the automated teller machine 100 with the aid of the cash trapping element E, the light beam 118 of the sensor unit 112 is interrupted over a longer period of time, in the range of minutes or hours. The duration, during which the detection signal is transmitted to the control unit, i.e., while the light beam 118 is interrupted, is thus an indicator of a tampering state of the automated teller machine 100. The tampering state is ascertained in particular if the duration of the transmission of the detection signal to the control unit exceeds a preset limit value, for example, in the range between 1 minute and 5 minutes.

Figure 3:
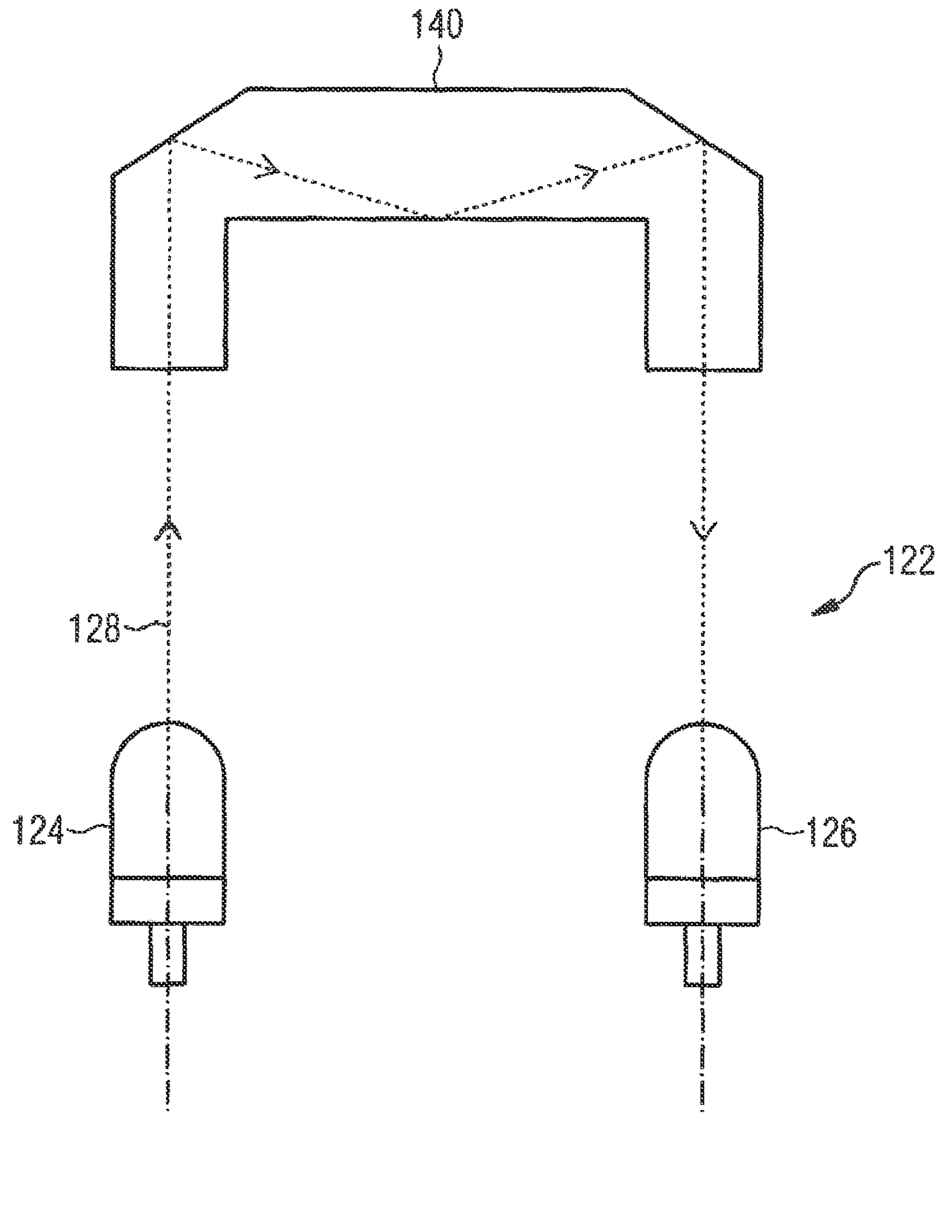
FIG. 3 shows a schematic illustration of a sensor unit, which can be arranged in the output region alternatively or additionally to the sensor unit as shown in FIG. 2.

FIG. 3 shows a schematic illustration of a sensor unit 122, which can be arranged alternatively or additionally to the sensor unit 112 in the output region 12. The sensor unit 122 is also designed as a reflection light barrier and is distinguished from the sensor unit 112 in that the light beam 128 is not deflected at a reflector film, but rather at a prism assembly 140 designed as a reflector element. The emitter 124 and the receiver 126 are arranged in or behind the lower delimitation wall 22 and the prism assembly 140 is arranged in or behind the opposite delimitation wall 18. The prism assembly 140 deflects the light beam 128 emitted by the emitter 124 so that at least a part of the light beam 128 is received by the optical receiver 126. If a body is located between the sensor unit 122 and the prism assembly 140, the light beam 128 is interrupted.

Figure 4:
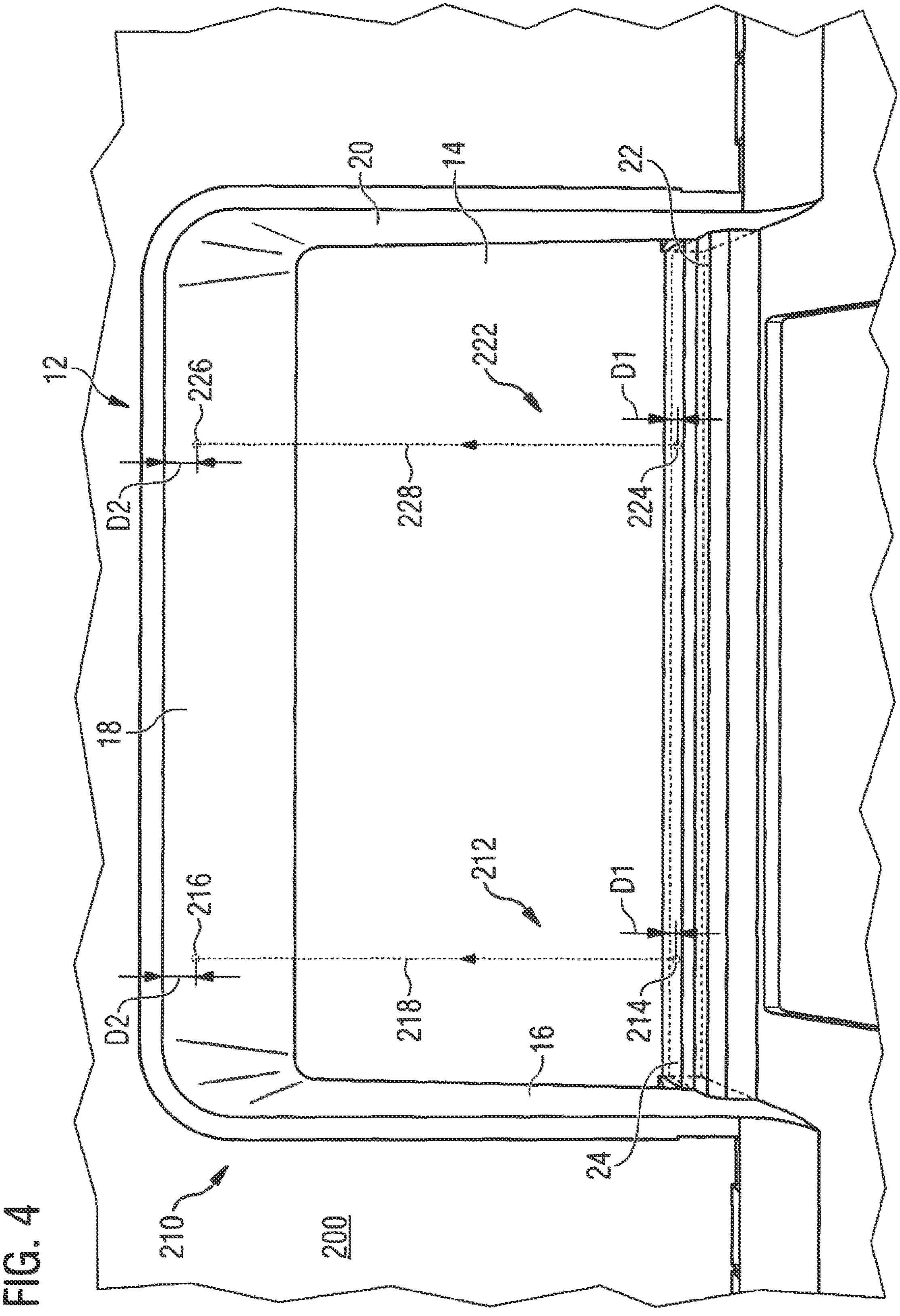
FIG. 4 shows an assembly for monitoring the output region according to a second embodiment.

FIG. 4 shows an assembly 210 for monitoring an output region 12 of an automated teller machine 200 according second embodiment. Elements having identical structure and identical function have the same reference signs. Two sensor units 212, 222, which are designed as one-way light barriers, are arranged in or behind the delimitation wall 22. The sensor units 212, 222 each comprise an emitter 214, 224 integrated in or behind the lower delimitation wall 22 and a receiver 216, 226, which is arranged opposite to the emitter 214, 224 and is arranged in or behind the delimitation wall 18. The emitters 214, 224 each emit a light beam 218, 228, which is detected by the receiver 216, 226.

In the second embodiment according to FIG. 4, the sensor units 212, 222 each generate a detection signal as soon as an interruption of the respective light beam 218, 228 is detected. As explained in conjunction with the first embodiment, the tampering status is ascertained in dependence on the duration of the detection signal, wherein in the second embodiment the tampering status is ascertained if the duration of the transmission of both detection signals exceeds the preset limit value, for example, in the range between 1 minute and 5 minutes. This in particular prevents an object randomly placed by the operator on the delimitation wall 22, which only interrupts one of the two light beams 118, 218, from triggering a detection of the tampering status of the automated teller machine 200.

Figure 5:
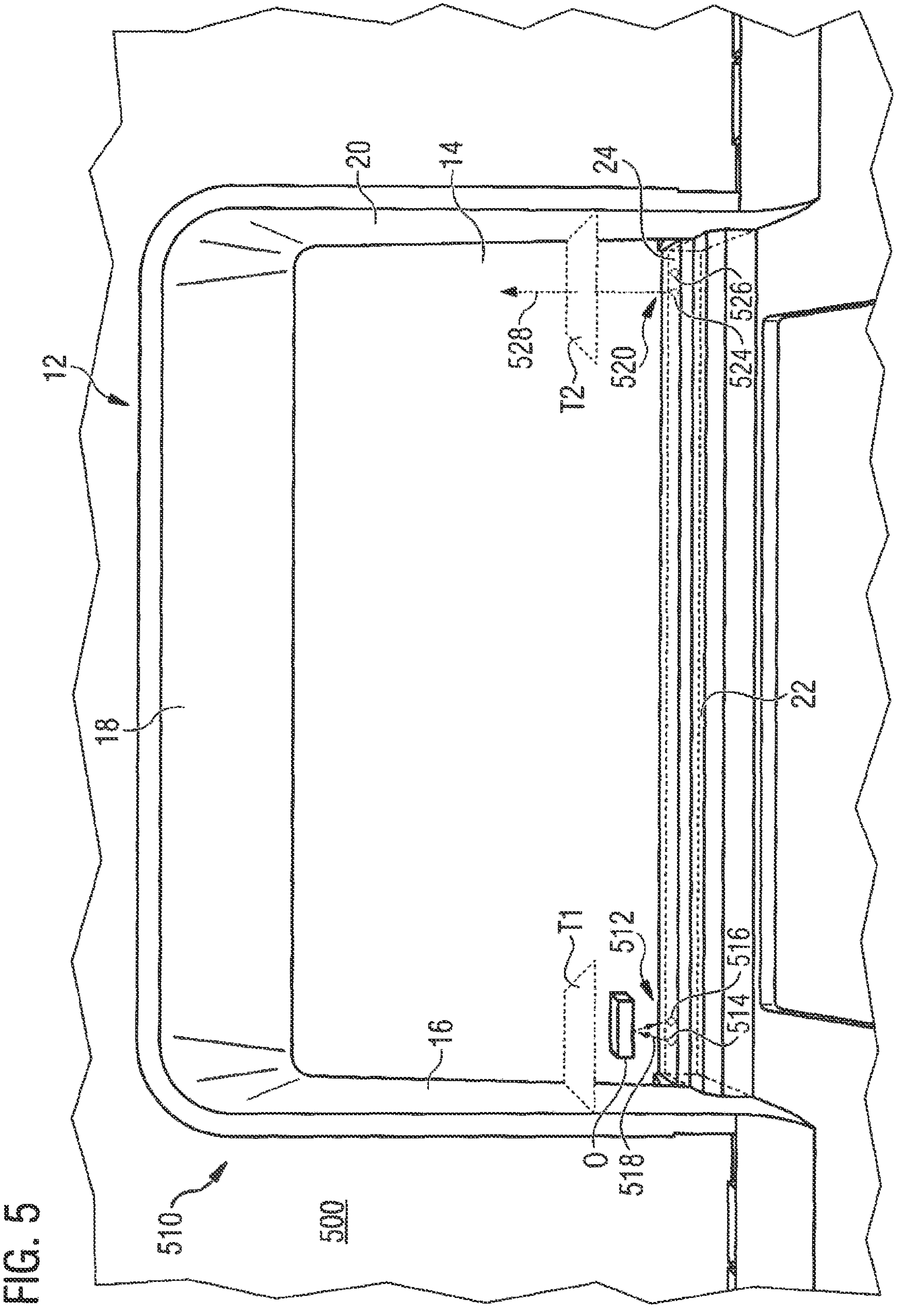
FIG. 5 shows an assembly for monitoring the output region according to a third embodiment.

FIG. 5 shows an assembly 510 for monitoring an automated teller machine 500 according to a third embodiment having two sensor units 512 and 520, which are designed as reflection light scanner units. The sensor units 512 and 520 each comprise an emitter 514, 524 and a receiver 516, 526, which are arranged in or behind the delimitation wall 22. The emitters 514, 524 each emit a light beam 518, 528. A scanning plane T1 delimits the maximum range of the sensor unit 512, the scanning plane T2 delimits the maximum range of the sensor unit 520. In FIG. 5, to simplify the explanation, an object O is arranged between the scanning plane T1 and the sensor unit 512. The light beam 518 is reflected at the object O and received by the receiver 516, which outputs a detection signal to the control unit. The light beam 528 of the sensor unit 520, in contrast, is not reflected between the scanning plane T2 of the sensor unit 520, so that the sensor unit 520 does not output a detection signal to the control unit. The control unit ascertains the tampering status of the automated teller machine 500 in particular if both sensor units 512, 520 output a detection signal and if the duration of the transmission of the two detection signals to the control unit exceeds the preset limit value, for example, in the range between 1 minute and 5 minutes.

FIG. 6 shows by way of example the automated teller machine 100 in a status in which the cash trapping element E is arranged in the output region 12 and conceals the shutter 14.

Figure 8:
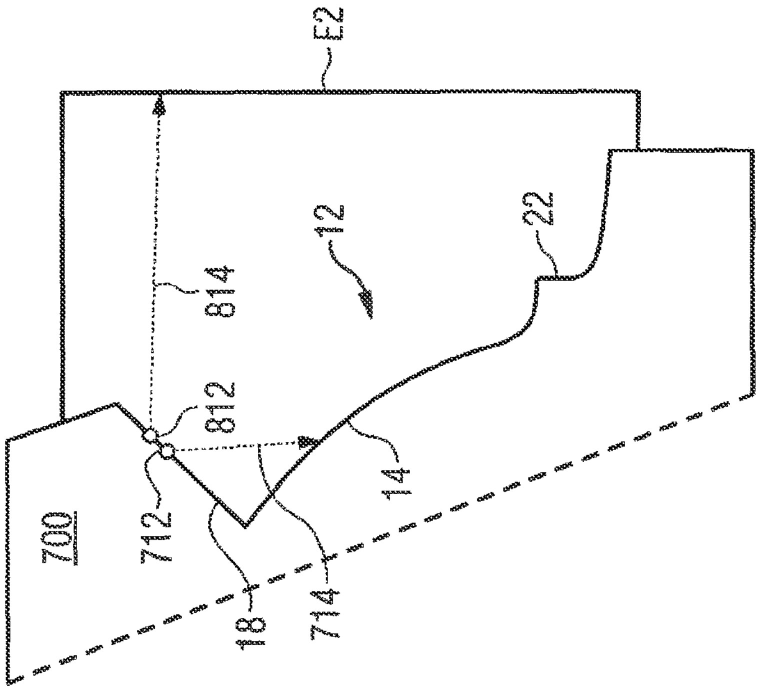
FIG. 8 shows a schematic cross section of the automated teller machine having an alternative further embodiment of the cash trapping element.
Figure 7:
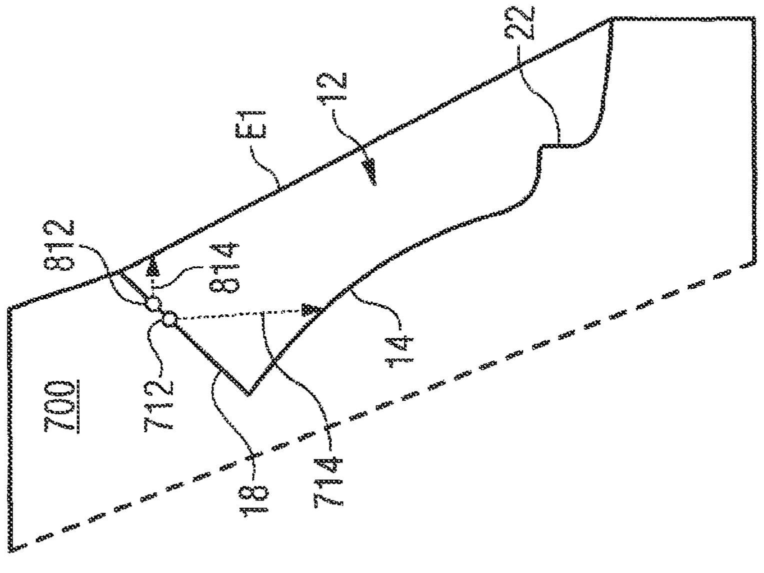
FIG. 7 shows a schematic cross section of the automated teller machine having a further embodiment of the cash trapping element.

FIG. 7 shows a schematic cross section of the automated teller machine 700 having a further embodiment of the cash trapping element E1. The cash trapping element E1 is an essentially straight cover plate, which is arranged in front of the shutter 14 such that the output region 12 is concealed in a shape-terminating manner by the cash trapping element E1. The cash trapping element E1 is preferably arranged flush with the front panel of the automated teller machine 700 in this case. FIG. 8 shows the automated teller machine 700 having an alternative, box-shaped embodiment of the cash trapping element E2, which is arranged as a front structure in front of the output region 12.

The automated teller machine 700 comprises a first sensor unit 712 and a second sensor unit 812. The first sensor unit 712 is arranged such that a cash trapping element E, E1, E2 arranged in the output region 12 is detected in a detection range of the sensor unit 712, wherein the direction of the extension of the detection range of the sensor unit 712 is identified by the arrow 714 directed toward the shutter 14. The second sensor unit 812, in contrast, is arranged such that a shape-terminating cash trapping element E1 or a box-shaped cash trapping element E2 is detected in a detection range of the sensor unit 812, wherein the direction of the extension of the detection range of the sensor unit 812 is identified by the outwardly directed arrow 814.

The sensor units 712, 812 can each be designed according to the above-described embodiments as a reflection light barrier, as a one-way light barrier, and/or as a sensor unit for outputting and detecting a continuous or pulsed laser beam.

In embodiments according to FIGS. 2 to 8, the emitters 114, 124, 214, 224, 514, 524 comprise light sources, which emit light of a single wavelength or a limited wavelength range. The wavelength is not variable here and corresponds to a specific light color.

The light sources of the emitters 114, 124, 214, 224, 514, 524 can alternatively in particular be an RGB light source, preferably an RGB-LED light source. The RGB light source can emit an RGB mixed light. An RGB LED is a combination of 3 LEDs, one of each base color red (R), green (G), or blue (B), in particular an RGB-LED assembly. These 3 LEDs can be arranged in the same housing or can be 3 individual LEDs which are arranged in direct spatial vicinity in relation to one another such that the human eye perceives the emitted light as mixed light. The RGB LED can emit an RGB mixed light in various RGB mixed colors, in which the individual LEDs for R, G, and B are actuated so that the ratio of the emitted light intensity of the individual LEDs is varied. Various further mixed colors can thus be mixed from the three base colors (RGB) by additive color mixing and the RGB mixed light can be generated.

In the embodiment according to FIGS. 2 to 8, the emitter 114, 124, 214, 224, 514, 524 emits light of a constant, nonvariable light color. Alternatively, the emitter 114, 124, 214, 224, 514, 524 can generate a variable RGB mixed light, for example, with the aid of the RGB LED. This enables a color change of the light emitted by the emitter 114, 124, 214, 224, 514, 524.

Furthermore, it is provided that at least one property of the light emitted by the emitter 114, 124, 214, 224, 514, 524, in particular of the light beam 118, 128, 218, 228, 518, 520, 818, 828 emitted in the direction of the receiver 116, 126, 216, 226, 516, 526, 816, 826 or the reflector 120 is varied over a time curve according to a preset or random pattern in order to improve the tampering security of the respective sensor unit 112, 122, 212, 222, 512, 520, 712, 812. The property of the light can comprise the light color and/or the brightness here. The light thus coded is registered by the receiver and the properties of the registered light are compared to the properties of the emitted light by the control unit. In the event of a deviation of the registered light from the emitted light, a tampering status is ascertained by the control unit. This can take place alternatively or additionally to the ascertainment, described further above, of a tampering status starting from a detection signal. The receiver 116, 126, 216, 226, 516, 526 is designed for this purpose so that it can register the RGB mixed light, for example, the receiver is an RGB sensor.

In the above-explained embodiments, the emitter 114, 124, 214, 224, 514, 524 comprises a single light source.

Figure 9:
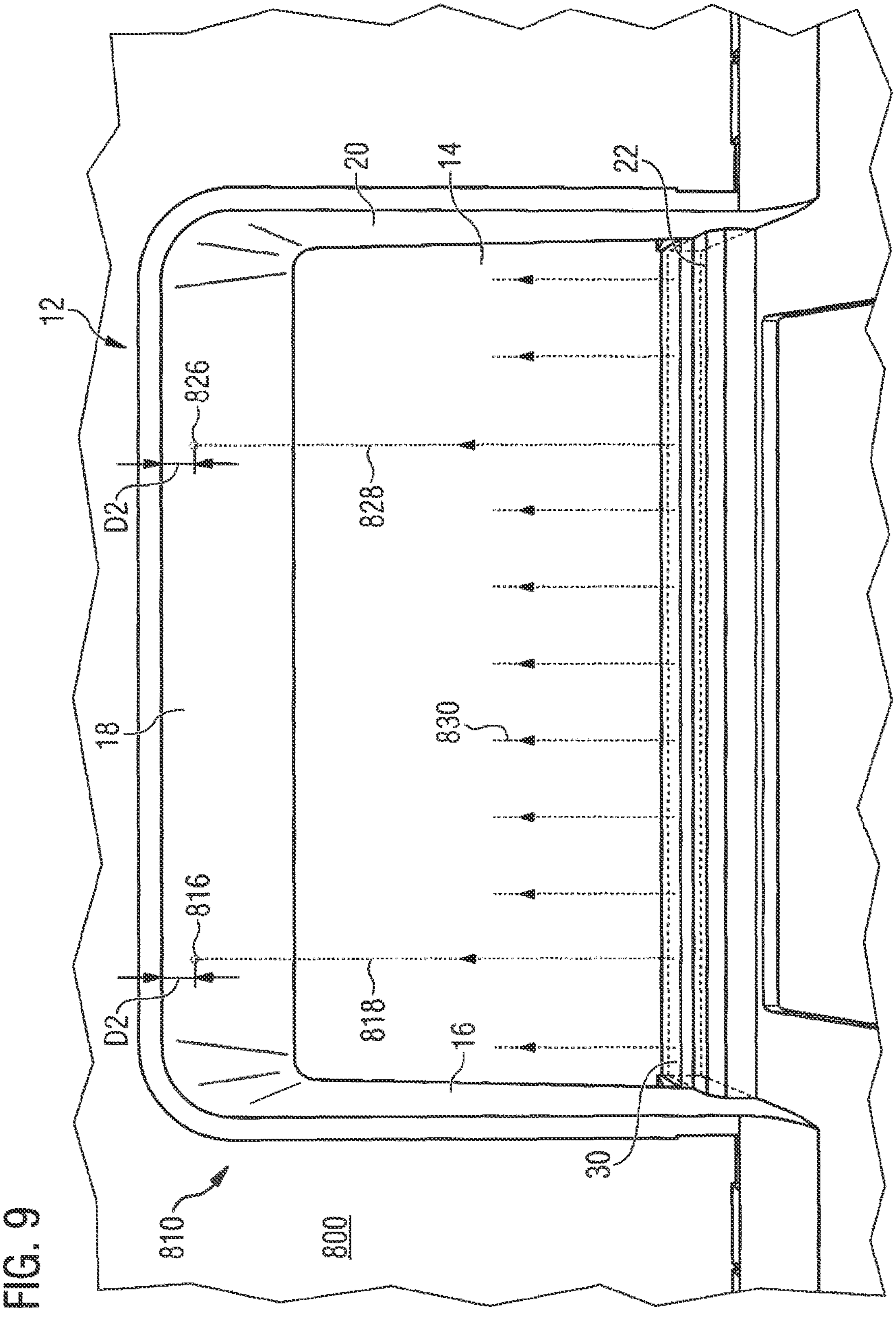
FIG. 9 shows an arrangement for monitoring the output region according to a fourth embodiment.

FIG. 9 shows an assembly 810 for monitoring an output region 12 of an automated teller machine 800 according to a fourth embodiment in which the emitter comprises multiple light sources. These light sources are arranged, for example, behind an optical element of the delimitation wall 22. The light emitted by the light sources is scattered by the optical element and radiated uniformly outward; the impression of a planar light source 30 thus results. The reference sign 830 shows by way of example a light beam of the planar light source 30. This planar light source 30 can be arranged, for example, in a strip shape in the output region 12. Multiple planar light sources 30 can be arranged here on one or more delimitation walls. The planar light sources 30 in particular comprise multiple RGB light sources here, for example, LED bands.

In particular in conjunction with RGB LEDs emitting variable RGB mixed light, the emitter designed as a planar light source 30 is typically perceived by the operator as a design element and can be used, for example, to illuminate the output region 12 and/or to signal operating states of the automated teller machine 800. Additionally to these functions, the light sources 30 are furthermore used as an emitter of a sensor unit. The receiver 816, 826 has to be able to register the RGB mixed light here, for example, the receiver is an RGB sensor. The light beams 818, 828 emitted in the direction of the receivers 816, 826 are registered thereby. Alternatively, the use of a reflector according to the embodiment as shown in FIG. 2 is possible, which reflects the light beams emitted in the direction of a reflector and then the light beams are detected with the aid of a receiver.

As described further above, a detection signal is generated as soon as an interruption of the respective light beam is detected. Furthermore, it is possible to vary properties of the light emitted by the planar light source 30 over a period of time and to thus increase the tampering security of the assembly 810.

In addition, monitoring other elements which are arranged on the operating side of the automated teller machine 100, in particular operating elements of the automated teller machine 100, is provided. For this purpose, sensor units, each comprising an emitter and a receiver, are arranged around or in the elements to be monitored. Monitoring multiple regions of the automated teller machine simultaneously is provided.

In one preferred embodiment, the sensor units 112, 122, 212, 222, 512, 520, 612 are not actuated when the shutter 14 is open. This in particular prevents a detection signal from being generated upon each money withdrawal. In one particularly preferred embodiment, two or more described embodiments are combined with one another.

Alternatively, it is possible that the receiver or receivers are arranged inside the output compartment and in particular only register the light emitted from an emitter arranged outside the output compartment when the shutter 14 is open. The control unit then ascertains tampering if a receiver arranged inside the output compartment does not register light emitted by the emitter even when the shutter 14 is open. This is the case in particular if a cash trapping element E conceals the shutter 14 and no light radiates into the output compartment when the shutter 14 is open.

In an alternative embodiment, alternatively or additionally to the described sensor units, brightness sensors can be used. A first brightness sensor is preferably integrated in the shutter 14, and a second brightness sensor is arranged outside the output region 12. The brightness sensors transmit measured values of the ambient brightness to the control unit. The control unit compares brightness curve of the first brightness sensor and that of the second brightness sensor and ascertains the tampering status if the duration, during which the measured values the preset limit value, is exceeded, for example, in the range between 1 minute and 5 minutes.

An assembly behind the delimitation wall 16 to 22 is preferably an assembly on the side of the delimitation wall 16 to 22 facing away from the output region 12.

In one particularly preferred embodiment, the control unit actuates the automated teller machine 100, 200, 500, 700, 800 from the point in time of ascertaining the tampering status in a fault operating mode. In the fault operating mode, the automated teller machine 100, 200, 500, 700, 800 cannot be actuated by the operator to output banknotes. In one preferred embodiment, the automated teller machine 100, 200, 500, 700, 800 is switched off automatically from the point in time of ascertaining the tampering status and an error message is output to a central control unit of the bank or a service provider. Furthermore, the automated teller machine can be automatically controlled from the point in time of ascertaining the tampering status so that partial functions are switched off. For example, a paying-out function of the automated teller machine can be switched off; other partial functions which cannot be manipulated by the cash trapping element still remain active. These partial functions can be a paying-in function or a display of the account balance.

The invention claimed is:

1. An automated teller machine comprising:

an output compartment with an output region for outputting notes of value;

a closure element moveable between an open position and a closed position and closing the output compartment when in the closed position;

wherein the output region is delimited in part by a first delimiting wall and a second delimiting wall, the first delimiting wall and the second delimiting wall facing each other on opposite sides of the output region;

wherein the output region which is further delimited by the closure element when the closure element is in the closed position;

an arrangement for monitoring the output region with at least one sensor unit arranged and configured to detect a cash trapping element arranged in the output region wherein the at least one sensor unit includes:

an optical element positioned in the first delimiting wall and having a strip shape, a plurality of light receivers positioned in the second delimiting wall, and a plurality of light emitters positioned behind the optical element, wherein light emitted by the plurality of light emitters is scattered by the optical element and radiated uniformly outward, wherein the light emitted by the plurality of light emitters is receivable by the plurality of light receivers, wherein the at least one sensor unit is configured to emit a detection signal in response to the plurality of light receivers not receiving the light emitted by the plurality of light emitters; and a control unit configured to receive the detection signal and to detect a tampering proceeding in response to receiving the detection signal.

2. The ATM of claim 1 wherein each of the plurality of light emitters comprise red-green-blue (RGB) light sources.

3. The ATM of claim 1 wherein the plurality of light receivers are recessed from a front edge of the output region five to ten millimeters.

4. The ATM of claim 1 wherein the output region is further delimited in part by a third delimiting wall and a fourth delimiting wall, the third delimiting wall and the fourth delimiting wall facing each other on opposite sides of the output region, and the optical element extends fully between the third delimiting wall and the fourth delimiting wall.

* * * * *